No. 715,722. Patented Dec. 9, 1902.
F. E. WOMER.
ROTARY ENGINE.
(Application filed Mar. 27, 1902.)
(No Model.) 2 Sheets—Sheet 1.
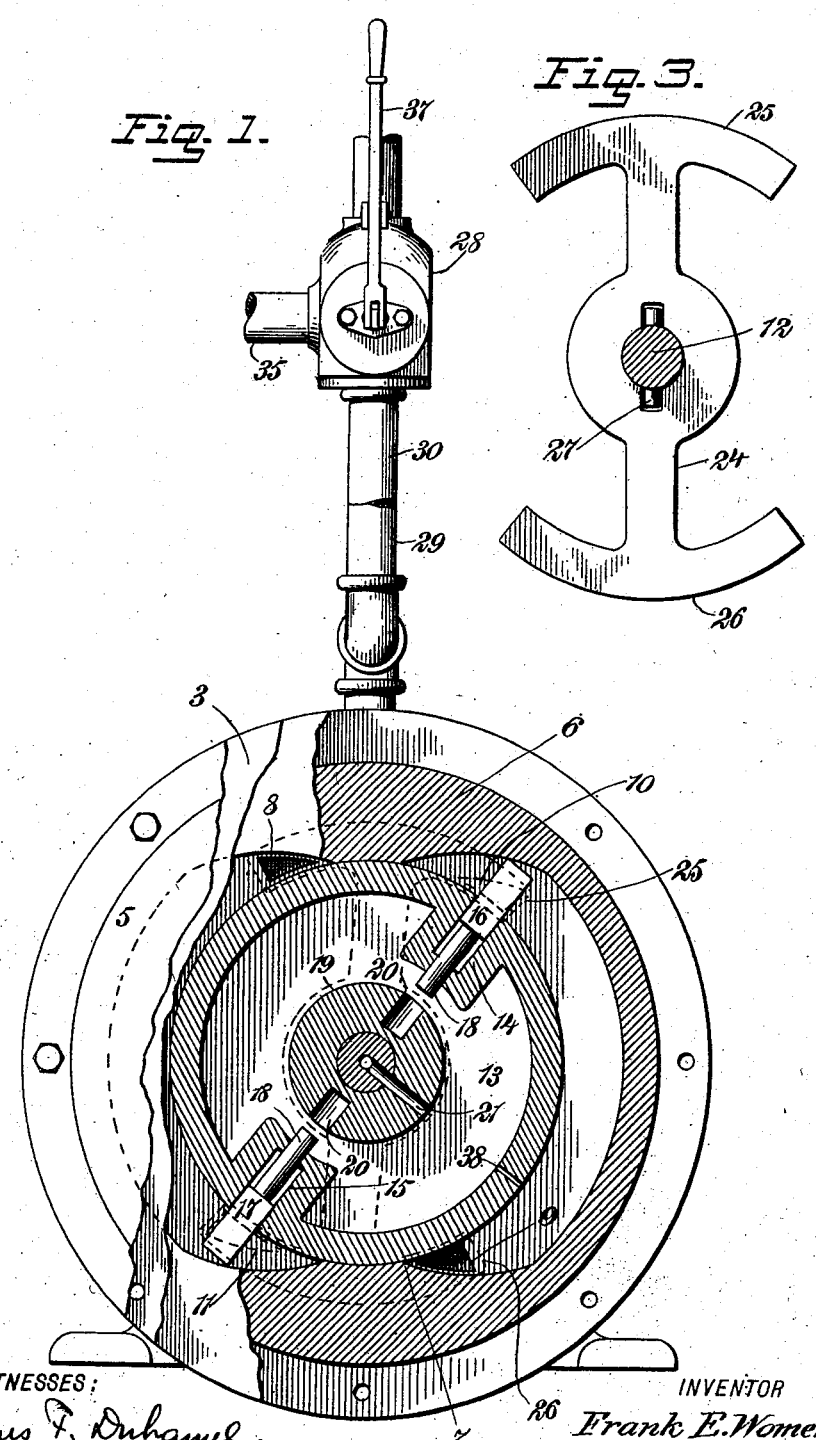
WITNESSES:
James F. Duhamel,
C. R. Ferguson
INVENTOR
Frank E. Womer
BY Munn
ATTORNEYS
THE NORRIS PETERS CO., PHOTO-LITHO., WASHINGTON, D. C.

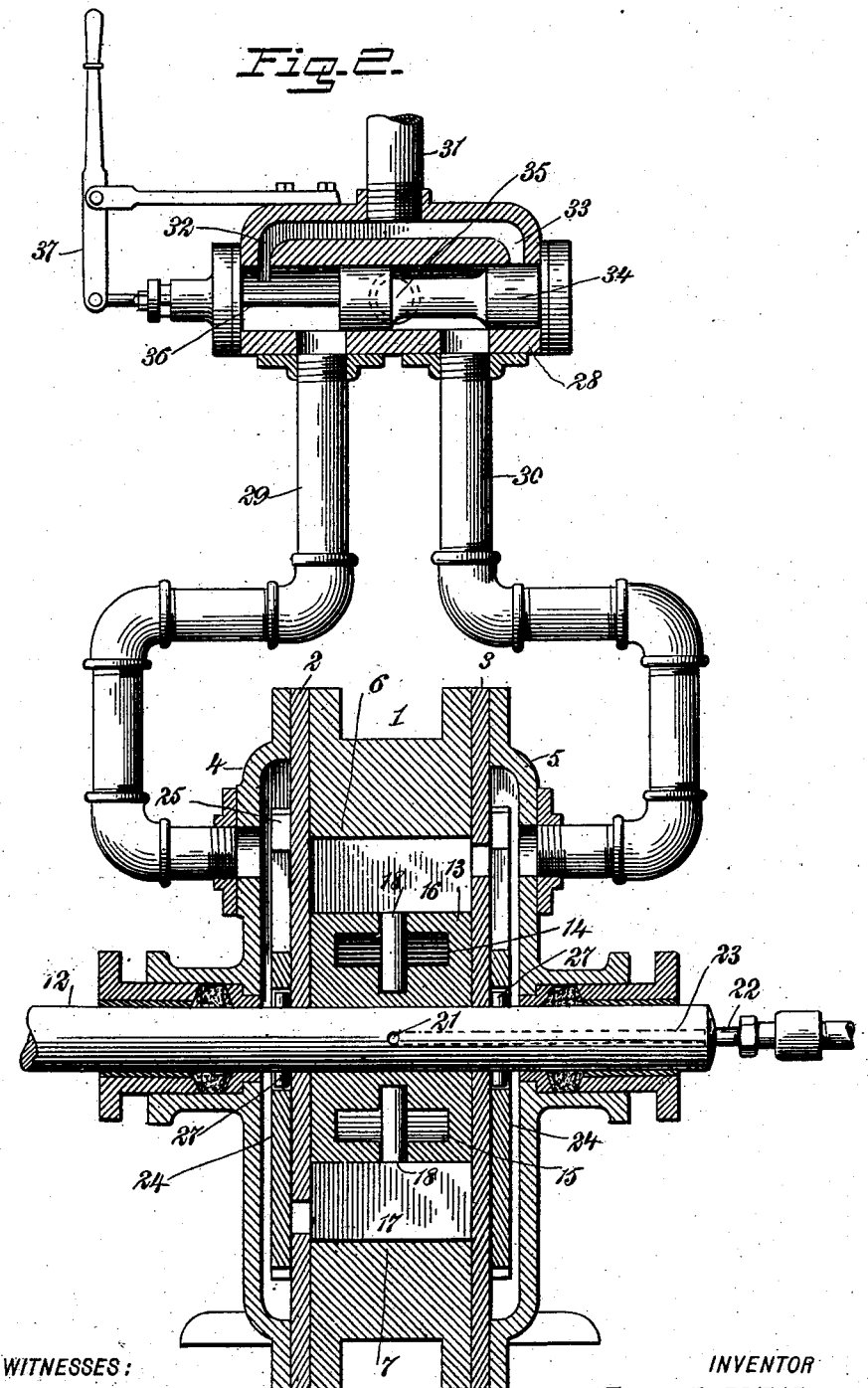

UNITED STATES PATENT OFFICE.

FRANK E. WOMER, OF FAIRHAVEN, WASHINGTON.

ROTARY ENGINE.

SPECIFICATION forming part of Letters Patent No. 715,722, dated December 9, 1902.

Application filed March 27, 1902. Serial No. 100,250. (No model.)

*To all whom it may concern:*

Be it known that I, FRANK E. WOMER, a citizen of the United States, and a resident of Fairhaven, in the county of Whatcom and State of Washington, have invented a new and Improved Rotary Engine, of which the following is a full, clear, and exact description.

This invention relates to improvements in rotary engines; and the object is to provide an engine of simple construction that may be operated by a comparatively small amount of motive agent.

I will describe a rotary engine embodying my invention and then point out the novel features in the appended claims.

Reference is to be had to the accompanying drawings, forming a part of this specification, in which similar characters of reference indicate corresponding parts in all the figures.

Figure 1 is a side view, partly in section, of a rotary engine embodying my invention. Fig. 2 is a transverse section thereof, and Fig. 3 shows one of the controlling-valves employed.

The engine-cylinder comprises a ring 1, to the opposite sides of which are connected the cylinder-heads 2 3. Steam-chests are located at each side of the cylinder. The outer walls of these steam-chests consist of plates 4 5, through the flanges of which bolts pass, the said bolts also passing through the cylinder-heads and through the flanges of the ring. At the inner side of the ring and at opposite points are the abutments 6 7, and arranged adjacent the abutments in the cylinder-head 2 are ports 8 and 9, the said ports being located at opposite points of the said abutments, while the cylinder-head 3 has similar ports, as indicated at 10 11 in dotted lines in Fig. 1.

A shaft 12 extends through the cylinder and has bearings in suitable stuffing-boxes attached to the steam-chest plates 4 5, and mounted on this shaft within the cylinder is a hollow piston 13. This piston is provided with opposite pockets 14 15, in which the piston-blades 16 17 are movable. These piston-blades have stem portions 18, movable through openings in the inner end walls of the pockets, and the hub 19 of the piston is provided with recesses 20 for receiving said stems when in their innermost position. The shaft 12 is provided with a longitudinal bore which terminates at about the center of the piston-hub 19 and has port communication 21 with the interior of the piston. An inlet-pipe 22 has steam-pipe connection with the outer end of the longitudinal bore 23 in the shaft, the connection being so made that the shaft may rotate relatively to the pipe 22.

Carried by the shaft 12 within each steam-chamber is a controlling-valve, each controlling-valve consisting of a cross-plate 24, attached to the shaft and having at its opposite ends segmental plates 25 26, which serve to open and close the ports, as will be hereinafter described. The controlling-valves may be conveniently attached to the shaft 12, so as to rotate therewith, by means of pins 27, passed through the shaft and engaging in slots formed in the plate 24 of the valve.

From a steam-chest 28 pipes 29 30 lead into the opposite steam-chests of the engine. A supply-pipe 31 communicates with the opposite ends of the steam-chest 28 through ports 32 33, and operating in this chest 28 is a throttle-valve 34, which is of reduced diameter between its ends to permit of the exhaust through the outlet 35, as will be hereinafter described. From the throttle-valve 34 a stem 36 leads outward through a head of the steam-chest 28 and is connected to a lever 37, by means of which it may be moved to direct the motive agent to either side of the engine, depending upon the direction in which the engine is to be operated.

In first starting the engine steam is admitted through the pipe 22 to the interior of the piston 13. The steam-pressure will force the blades 16 and 17 outward, and so hold them until the rotary movement is sufficient to force them outward by centrifugal action. Then upon cutting off the steam from the pipe 22 the steam within the piston will exhaust through a port 38, formed in the rim of the piston. When the throttle-valve is in the position indicated in Fig. 2, the motive agent will pass through the pipe 29 and thence through the ports 8 and 9, exerting its pressure against the piston-blade which shall be forward of said ports. As the segmental plates 25 26 of the controlling-valve close the ports 8 and 9 steam will act expansively until the piston-blades pass onto or over the abutments 6 and 7. The exhaust rearward of the blades will pass out through the ports 10 and 11 to the opposite steam-chest, and thence out through the pipe 30, around the central portion of the throttle-valve, and then out through the exhaust 35.

When it is desired to rotate the engine in the opposite direction, it is only necessary to reverse the position of the throttle-valve, when the motive agent will flow in the direction opposite that first described.

It is quite obvious that an engine embodying my invention may be made compound or triple expansion by simply increasing the number of engines, connecting one with another.

Having thus described my invention, I claim as new and desire to secure by Letters Patent—

1. A rotary engine comprising a cylinder provided with abutments, steam-chests on opposite sides of the cylinder, a shaft extended through the cylinder, a hollow piston mounted on the shaft within the cylinder, outwardly-moving piston-blades carried by the piston, and controlling-valves operating in the opposite steam-chests for controlling ports through the cylinder-heads, the said valves consisting of segmental plates rigidly connected to the shaft, substantially as specified.

2. A rotary engine comprising a cylinder, the heads thereof being provided with ports, abutments in the cylinder, steam-chests on opposite sides of the cylinder, means for controlling the passage of motive agent to said chests, a shaft extended through the cylinder and through the outer walls of the steam-chests, a piston mounted on said shaft within the cylinder, blades movable outward and inward in said piston, and controlling-valves for the ports through the cylinder-heads, consisting of segmental plates carried by the shaft, substantially as specified.

3. A rotary engine comprising a cylinder having heads provided with ports, opposite abutments in said cylinder, steam-chests on opposite sides of the cylinder, means for directing steam to said chests, a shaft extended through the cylinder, a hollow piston mounted on the shaft within the cylinder, the said shaft being provided with a longitudinal bore communicating with the interior of the piston, piston-blades movable in pockets in the piston, and having stem portions movable in openings in the inner walls of the pockets to be acted on by steam-pressure for forcing the blades outward in the starting of the engine, the said piston having an exhaust-port, and controlling-valves arranged in the steam-chest and carried by the shaft, substantially as specified.

4. A rotary engine comprising a cylinder having heads provided with ports, opposite abutments in the cylinder, the ports of a head being arranged at opposite sides of opposite abutments, steam-chests on opposite sides of the cylinder, a shaft extended through the cylinder, a piston mounted on said shaft, outwardly-movable blades carried by the piston, a steam-chest for receiving the initial motive agent, connections between said steam-chest and the steam-chests at the opposite sides of the cylinder, and a throttle-valve in said receiving-chest, substantially as specified.

5. A rotary engine comprising a cylinder having opposite abutments, heads on said cylinder provided with ports at opposite sides of the abutments, steam-chests on opposite sides of the cylinder, a shaft extended through the cylinder and through the outer walls of the steam-chests, controlling-valves for the ports, arranged in said steam-chests, each controlling-valve consisting of a plate attached to the shaft so as to rotate therewith and segmental plates at the ends, and means for controlling the inlet and outlet of steam to the steam-chests, substantially as specified.

In testimony whereof I have signed my name to this specification in the presence of two subscribing witnesses.

FRANK E. WOMER.

Witnesses:
E. S. McCORD,
M. W. BENSON.